(12) United States Patent
Arrasvuori et al.

(10) Patent No.: US 9,204,131 B2
(45) Date of Patent: Dec. 1, 2015

(54) REMOTE CONTROL SYSTEM

(75) Inventors: Juha Arrasvuori, Tampere (FI); Tuomas Vaittinen, Helsinki (FI); Petri Piippo, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/700,217

(22) PCT Filed: Sep. 14, 2012

(86) PCT No.: PCT/FI2012/050892
§ 371 (c)(1),
(2), (4) Date: Nov. 27, 2012

(87) PCT Pub. No.: WO2014/041235
PCT Pub. Date: Mar. 20, 2014

(65) Prior Publication Data
US 2015/0181200 A1 Jun. 25, 2015

(51) Int. Cl.
| | | |
|---|---|---|
| *H04N 13/02* | (2006.01) | |
| *G06K 9/00* | (2006.01) | |
| *G06T 19/20* | (2011.01) | |
| *H04N 5/232* | (2006.01) | |
| *G06F 3/0488* | (2013.01) | |
| *G06F 3/0484* | (2013.01) | |
| *H04L 29/06* | (2006.01) | |

(52) U.S. Cl.
CPC ............. *H04N 13/0275* (2013.01); *G06K 9/00* (2013.01); *G06K 9/00201* (2013.01); *G06K 9/00671* (2013.01); *G06T 19/20* (2013.01); *H04N 5/23293* (2013.01); *G06F 3/0484* (2013.01); *G06F 3/0488* (2013.01); *G06T 2219/2016* (2013.01); *H04L 29/06* (2013.01)

(58) Field of Classification Search
CPC ............ G06K 9/00; G06F 3/00; G06T 19/00; H04N 5/00
See application file for complete search history.

(56) References Cited

U.S. PATENT DOCUMENTS

| | | | | |
|---|---|---|---|---|
| 8,938,464 | B2 * | 1/2015 | Bailly et al. | 707/758 |
| 2009/0141019 | A1 | 6/2009 | Lobko et al. | |
| 2009/0215471 | A1 | 8/2009 | Sands et al. | |
| 2011/0016405 | A1 * | 1/2011 | Grob et al. | 715/740 |
| 2012/0327122 | A1 * | 12/2012 | Imamura | 345/649 |

FOREIGN PATENT DOCUMENTS

WO 2011009069 A2 1/2011

OTHER PUBLICATIONS

Notification of Transmittal of The International Search Report and The Written Opinion of The International Searching Authority, or The Declaration; International Search Report; Written Opinion for corresponding Application No. PCT/FI2012/050892, dated Jun. 11, 2013, pp. 1-15.

medialoot.com, "Skeuomorphic Design: What it is, Who uses it, and Why You Need to Know", document published Mar. 16, 2012, retrieved on Jun. 11, 2013 from web page http://web.archive.org/web/20120316182733/http://medialoot.com/blog/skeuomorphic-design/, 7 pages.

* cited by examiner

Primary Examiner — Huy T Nguyen
(74) Attorney, Agent, or Firm — Alston & Bird LLP

(57) ABSTRACT

A method comprising: capturing, by a device equipped with a camera, at least one image about a physical object; recognizing the physical object on the basis of the at least one captured image; retrieving a 3-dimensional (3D) model of the physical object from a memory; and showing the 3D model of the physical object on a display of the device.

25 Claims, 10 Drawing Sheets

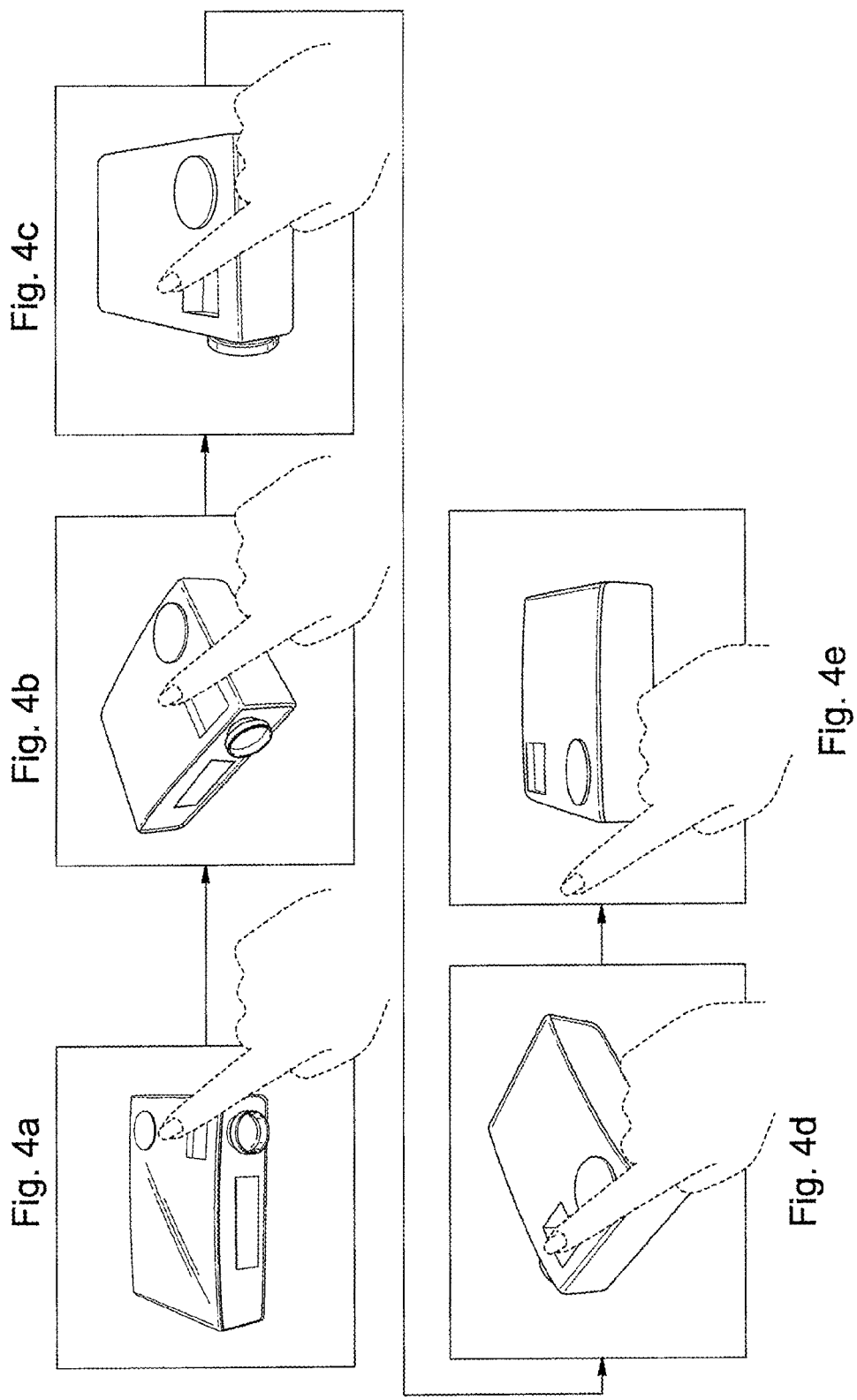

Fig. 6a
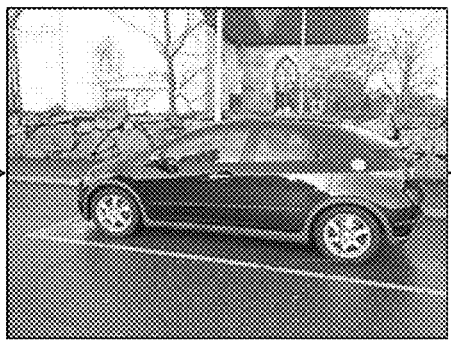
Fig. 6b
Fig. 6c
Model specifications:
  type: ...
  engine: ...
  etc.
Fig. 6d

REMOTE CONTROL SYSTEM

BACKGROUND

The number of devices connected to the Internet is increasing rapidly, including not only traditional communication devices, such as computers and mobile phones, but also various peripheral devices, such as printers, data projectors, etc. In addition, sensors and actuators can be embedded practically in any physical object, which enable to identify the physical objects and link them to wired and wireless networks, for example using NFC (Near-Field Connection) or RFID (Radio Frequency Identification) technology.

All these devices connected to Internet or being provided with some other means of communication are, at least in theory, controllable through a network connection. For example, a visitor coming to an office may wish to use a peripheral device, e.g. a printer, in the office. On the other hand, someone may see an interesting device in a shop or on a street, and he/she may wish to obtain more information about the device.

Nevertheless, no universally valid and intuitive method for obtaining information about these devices or controlling them remotely has been presented.

SUMMARY

Now there has been invented an improved method and technical equipment implementing the method for at least alleviating the problems. Various aspects of the invention include a method, apparatuses and computer programs, which are characterized by what is stated in the independent claims. Various embodiments of the invention are disclosed in the dependent claims.

According to a first aspect, there is provided a method comprising: capturing, by a device equipped with a camera, at least one image about a first physical object; recognizing the first physical object on the basis of the at least one captured image; retrieving a 3-dimensional (3D) model of the first physical object from a memory; and displaying the 3D model of the first physical object on a display of the device.

According to an embodiment, the method further comprises recognizing the first physical object by computer vision.

According to an embodiment, the method further comprises providing an estimation of confidence of recognition of the first physical object, indicated as proportional to a perfect match.

According to an embodiment, the method further comprises in response to the estimation of confidence of recognition of the first physical object indicating a non-perfect match, prompting a plurality of 3D models of first physical objects on the display of the device for a user to select.

According to an embodiment, the method further comprises providing means for rotating the 3D model on the display.

According to an embodiment, the display is a touch screen and said means for rotating the 3D model are responsive to a touch detected on the screen.

According to an embodiment, the method further comprises providing the 3D model with additional information about the first physical object to be shown on the display.

According to an embodiment, the method further comprises obtaining identification data of an apparatus recognized as the first physical object via an Internet connection or a close-proximity radio connection.

According to an embodiment, the method further comprises establishing a connection between the device and the apparatus recognized as the first physical object based on the identification data.

According to an embodiment, the establishing the connection includes performing authentication and authorization between the device and the apparatus to check the access rights of the user of the device.

According to an embodiment, the method further comprises providing the 3D model with at least one interactive user interface of the apparatus for controlling the operation of apparatus remotely.

According to an embodiment, the method further comprises displaying an area of the at least one interactive user interface of the apparatus highlighted on the 3D model; and in response to a user command detected on said area, displaying the corresponding interactive user interface of the apparatus on the display of the device.

According to an embodiment, the method further comprises in response to a user command detected on said interactive user interface, transmitting a corresponding command to the apparatus via the connection established between the device and the apparatus.

According to an embodiment, the first physical object is a building or an architectural object.

According to an embodiment, the method further comprises recognizing a second physical object on the basis of the at least one captured image; retrieving a 3-dimensional (3D) model of the second physical object from a memory; and displaying the 3D model of the second physical object on a display of the device.

According to an embodiment, the method further comprises providing a camera view of a space interconnecting the first and the second physical object; and compressing visual information between the first physical object and the second physical object in the display image such that 3D models of buildings or architectural objects appearing at the second point are superimposed on top of the actual buildings or architectural objects in the camera view.

According to an embodiment, the method further comprises obtaining location information of the device and orientation information of the camera view of the device; recognizing one or more of the buildings and architectural objects appearing in the camera view based on the location and orientation information; obtaining an input of the first point in the camera view from the user; obtaining an input of the second point in the camera view from the user, said first and second points indicating a foreground object and a background object of the camera view; retrieving a 3D model of the recognized foreground and background objects from a memory; obtaining an input of space compression in the camera view from the user; and providing a compressed camera view with a 3D model of the building or an architectural object superimposed on an image part of the background object of the camera view such that the size of the 3D model is increased proportional to the input of space compression.

According to an embodiment, said input of the first point is obtained by detecting a finger press of the user on a first part of a touch screen showing the camera view; and said input of the second point is obtained by detecting a finger press of the user on a second part of the touch screen showing the camera view, while keeping the first point touched.

According to an embodiment, said input of the space compression is obtained by detecting a pinching gesture with the fingers pressing the first and second part of the touch screen.

According to an embodiment, the length of the pinching gesture defines the amount of compressing the space between first and second point.

According to a second aspect, there is provided an apparatus comprising at least one processor, memory including computer program code, the memory and the computer program code configured to, with the at least one processor, cause the apparatus to at least: capturing, by a device equipped with a camera, at least one image about a first physical object; recognizing the first physical object on the basis of the at least one captured image; retrieving a 3D model of the first physical object from a memory; and displaying the 3D model of the first physical object on a display of the device.

According to a third aspect, there is provided a computer program embodied on a non-transitory computer readable medium, the computer program comprising instructions causing, when executed on at least one processor, at least one apparatus to: capturing, by a device equipped with a camera, at least one image about a first physical object; recognizing the first physical object on the basis of the at least one captured image; retrieving a 3D model of the first physical object from a memory; and displaying the 3D model of the first physical object on a display of the device.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIGS. 1a and 1b show a system and devices suitable to be used in a remote control system according to an embodiment;

FIGS. 4a-4e show how a user of the mobile device may rotate the 3D model on the display according to an embodiment;

FIGS. 6a-6d show another exemplified implementation of the remote control method on a mobile device according to an embodiment;

DESCRIPTION OF EMBODIMENTS

Figure 1A:
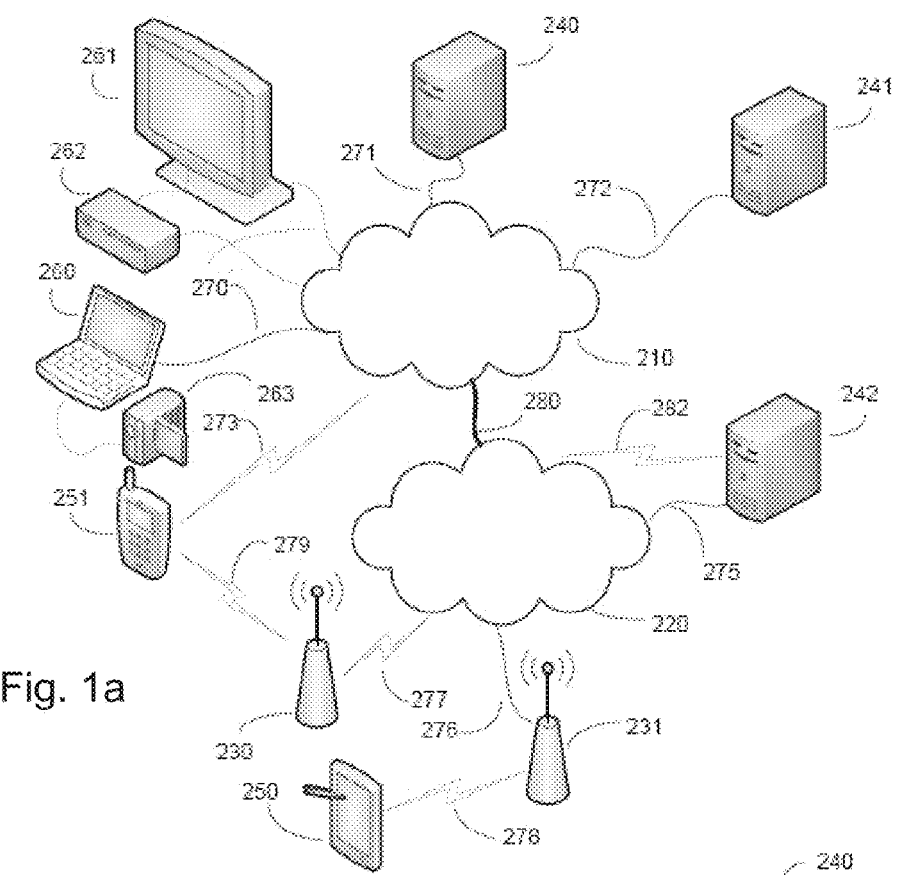
Figure 1B:
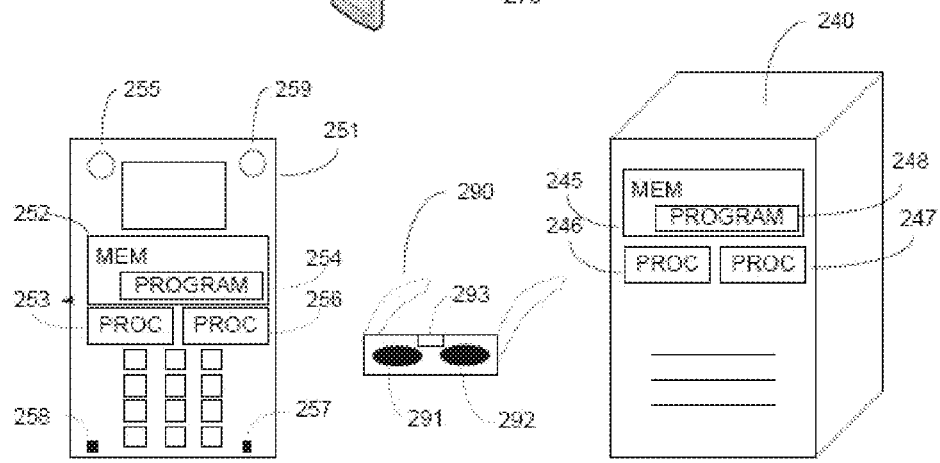

FIGS. 1a and 1b show a system and devices suitable to be used in an augmented reality system according to an embodiment. In FIG. 1a, the different devices may be connected via a fixed network 210 such as the Internet or a local area network; or a mobile communication network 220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 280. The networks comprise network elements such as routers and switches to handle data (not shown), and communication interfaces such as the base stations 230 and 231 in order for providing access for the different devices to the network, and the base stations 230, 231 are themselves connected to the mobile network 220 via a fixed connection 276 or a wireless connection 277.

There may be a number of servers connected to the network, and in the example of FIG. 1a are shown servers 240, 241 and 242, each connected to the mobile network 220, which servers may be arranged to operate as computing nodes (i.e. to form a cluster of computing nodes or a so-called server farm) for the augmented reality system. Some of the above devices, for example the computers 240, 241, 242 may be such that they are arranged to make up a connection to the Internet with the communication elements residing in the fixed network 210.

There are also a number of end-user devices such as mobile phones and smart phones 251, Internet access devices (Internet tablets) 250, personal computers 260 of various sizes and formats, televisions and other viewing devices 261, video decoders and players 262, as well as video cameras 263 and other encoders. These devices 250, 251, 260, 261, 262 and 263 can also be made of multiple parts. The various devices may be connected to the networks 210 and 220 via communication connections such as a fixed connection 270, 271, 272 and 280 to the internet, a wireless connection 273 to the internet 210, a fixed connection 275 to the mobile network 220, and a wireless connection 278, 279 and 282 to the mobile network 220. The connections 271-282 are implemented by means of communication interfaces at the respective ends of the communication connection.

FIG. 1b shows devices for an augmented reality system according to an example embodiment. As shown in FIG. 1b, the server 240 contains memory 245, one or more processors 246, 247, and computer program code 248 residing in the memory 245 for implementing, for example, an augmented reality system. The different servers 241, 242, 290 may contain at least these elements for employing functionality relevant to each server.

Similarly, the end-user device 251 contains memory 252, at least one processor 253 and 256, and computer program code 254 residing in the memory 252 for implementing, for example, gesture recognition. The end-user device may also have one or more cameras 255 and 259 for capturing image data, for example stereo video. The end-user device may also contain one, two or more microphones 257 and 258 for capturing sound. The end-user device may also contain sensors for generating the depth information using any suitable technology. The different end-user devices 250, 260 may contain at least these same elements for employing functionality relevant to each device. In another embodiment of this invention, the depth maps (i.e. depth information regarding the distance from the scene to a plane defined by the camera) obtained by interpreting video recordings from the stereo (or multiple) cameras may be utilised in the augmented reality system. The end-user device may also have a time-of-flight camera, whereby the depth map may be obtained from a time-of-flight camera or from a combination of stereo (or multiple) view depth map and a time-of-flight camera. The end-user device may generate depth map for the captured content using any available and suitable mechanism.

The end user devices may also comprise a screen for viewing single-view, stereoscopic (2-view), or multiview (more-than-2-view) images. The end-user devices may also be connected to video glasses 290 e.g. by means of a communication block 293 able to receive and/or transmit information. The glasses may contain separate eye elements 291 and 292 for the left and right eye. These eye elements may either show a picture for viewing, or they may comprise a shutter functionality e.g. to block every other picture in an alternating manner to provide the two views of three-dimensional picture to the eyes, or they may comprise mutually orthogonal polarization filters, which, when connected to similar polarization realized on the screen, provide the separate views to the eyes. Other arrangements for video glasses may also be used to provide stereoscopic viewing capability. Stereoscopic or multiview screens may also be autostereoscopic, i.e. the screen may comprise or may be overlaid by an optics arrangement, which results into a different view being perceived by each eye. Single-view, stereoscopic, and multiview screens may also be operationally connected to viewer tracking in such a manner that the displayed views depend on viewer's position, distance, and/or direction of gaze relative to the screen.

The end user devices may also comprise various sensors for providing sensor data that can assist different applications and services in contextualizing how the devices are used. The sensor data may include at least one or more of the following:

- position information indicating the position of the user device. The position may be determined, for example, using satellite positioning system such as GPS (Global Positioning System), using cell identification of a mobile communication network, using ad-hoc WLAN, Near Field Communication (NFC), Bluetooth or using any indoor positioning system. The position may also be determined as relative position to other user devices or a reference point.
- orientation information indicating the orientation of the user device with relation to the magnetic north. The orientation information may be determined, for example, using a compass.
- altitude information with relation to the horizontal, determined for example using an accelerometer.
- position information of the user device in 3-dimensional space in terms of the angles of rotation in three dimensions about the user device's center of mass, i.e., so-called roll, pitch and yaw. The 3d space position may be determined using a gyroscope.

It needs to be understood that different embodiments allow different parts to be carried out in different elements. For example, parallelized processes of the augmented reality system may be carried out in one or more processing devices; i.e. entirely in one user device like 250, 251 or 260, or in one server device 240, 241, 242 or 290, or across multiple user devices 250, 251, 260 or across multiple network devices 240, 241, 242, 290, or across both user devices 250, 251, 260 and network devices 240, 241, 242, 290. The elements of the augmented reality system may be implemented as a software component residing on one device or distributed across several devices, as mentioned above, for example so that the devices form a so-called cloud.

The number of devices connected to the Internet is increasing exponentially. These devices include not only traditional communication devices, such as computers and mobile phones, but also various peripheral devices, such as printers, data projectors, etc. In addition, sensors and actuators can be embedded practically in any physical object, which enable to link the physical objects to wired and wireless networks, for example using the Internet Protocol (IP). Thus, any physical object can be provided with a unique identification. The network connection may be based on Wi-Fi, Bluetooth, NFC (Near-Field Connection) or RFID (Radio Frequency Identification) technology or a wired connection to the Internet.

The network connection and the unique identification enable these billions of devices to produce, transmit, receive and process information in different environments, such as logistic applications and factories as well as in the work and everyday lives of people. This concept, in which the Internet and wireless technologies connect different sources of information such as sensors, mobile devices, vehicles etc. in an ever tighter manner, is also referred to as "Internet of Things" (IoT).

All these devices connected to Internet or being provided with some other means of communication are, at least in theory, controllable through a network connection. For example, a visitor coming to an office may wish to use a peripheral device, e.g. a printer, in the office. On the other hand, someone may see an interesting device in a shop or on a street, and he/she may wish to obtain more information about the device.

Nevertheless, no universally valid and intuitive method for obtaining information about these devices or controlling them remotely has been presented. If a user wishes to obtain more information about an interesting device, he/she must typically first determine the particulars of the device; the manufacturer, the model details, etc. and then, for example, browse from the Internet further information about the device.

Also the remote control of such devices is made practically impossible, or at least cumbersome, for visitors. Typically, the control of the devices is subordinated to the administrator of the network they are connected to. Thus, a user wishing to control a device must typically first request access rights from the administrator and then connect to the same network with the device. However, the administrators may not be willing to grant access rights for visitors for security reasons.

In order to alleviate these problems, a new method for remotely controlling devices connected to a network is presented herein. The method utilizes so-called augmented reality, which refers to a technology in which user's perception of the real world is enhanced by rendering "augmented" virtual content, typically generated by a computing device, on top of a view from the real world. The virtual content may include, for example, 2D-models, such as virtual labels, 3D-models, such as virtual articles, illumination and/or shading. The virtual content is aligned with the view of the real world so as to enhance the information content of the view of the real world or to provide usability through the view of the real world.

Figure 2:
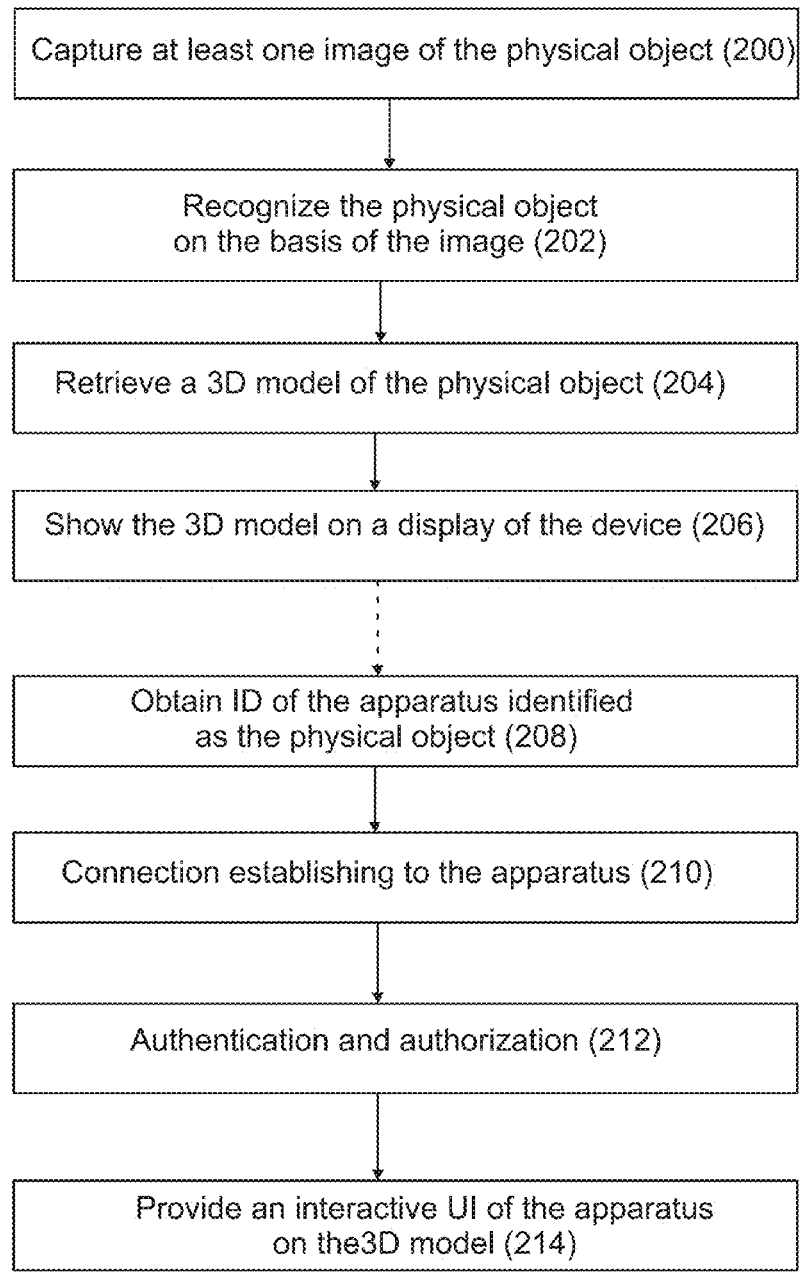
FIG. 2 shows a flow chart of a remote control method according to an embodiment.

A method according to a first aspect and various embodiments related thereto are now described by referring to the flow chart of FIG. 2.

With a device equipped with a camera, the camera is pointed to a physical object and at least one image is captured (200) about the object.

The physical object is recognized (202) on the basis of at least one captured image. According to an embodiment, a computer vision application is used for identifying the object. Various computer vision applications are based on algorithms that analyze properties of the external world by means of the light reflected from various objects. In identification/recognition algorithms, distinct features of the image data are extracted and segmented according to predefined rules and based on this analysis, the detected object is classified to belong to at least one predefined category. The categories may be arranged in hierarchical manner, starting from coarse fidelity distinguishing e.g. office peripherals or vehicles from other objects. The coarse fidelity categories may then be divided into several finer fidelity sub-categories, for example in the category of vehicles distinguishing e.g. automobiles from tractors and other working machines, or in a category of office peripherals distinguishing e.g. displays from printers, etc. These sub-categories may then be divided into one or several hierarchical finer fidelity sub-categories until the desired level of fidelity is obtained.

The computer vision application may be provided with an optical character recognition (OCR) application for recognizing characters and/or words included in the physical object. The use of natural language may help to obtain a reliable recognition of the physical object.

It is nevertheless possible that an absolutely reliable recognition of the physical object is not achieved, for example due to inadequate image quality, which may result e.g. from poor illumination conditions. According to an embodiment, the computer vision application may provide an estimation of confidence of recognition, which may be indicated as proportional to a perfect match. The perfect match may be indicated, for example, as 100% or as a particular color or by any other illustrative means. According to an embodiment, in case of a non-perfect match the user may be provided with several options of physical objects to choose from in order to find the correct physical object. For example, in case of 90% confidence level a couple of physical objects, say 2 or 3, could be shown, but the number of physical objects to be shown may increase as the confidence level decreases; i.e. in case of 60% confidence level, for example 5 options of physical objects could be shown.

On the basis of the recognition data of the physical object, a 3D model about the physical object is retrieved (204) from a memory. The memory may be included in the device, it could be an external memory connected to the device, such as a memory stick or an optical disc, or it could be a remote database located in a network.

The 3D model database may be operated and maintained by one or more apparatus manufacturers. The manufacturers may provide updates of 3D models of their apparatuses to the database, which may be, for example, manufacturer-specific or apparatus-type-specific (e.g. printers). On the other hand, the 3D model database may also be a general database for all kinds of physical objects, operated e.g. by a third party, whereby the database may be sub-divided into appropriate categories to help to find a 3D model of the recognized physical object. The most commonly used 3D models may be downloaded e.g. regularly the memory of the device for decreasing the need for retrieving the 3D models from the network every time.

The 3D model may then be shown on a display of the device (206). The user interface of the device may provide means for rotating the 3D model freely on the display. The display may preferably be a touch screen, whereby the user of the device may rotate the 3D model by touching the screen. The 3D model may also be provided with additional information of the physical object, such as specifications or user manual of an apparatus identified as the physical object.

According to an embodiment, the user of the device may be provided with an opportunity to control the apparatus identified as the physical object. For that purpose, the device may obtain identification data of the apparatus (208). The identification data may be, for example, an IP address, if the apparatus is connected to Internet, or any other kind of identification data obtainable directly from the apparatus, for example via a close-proximity radio connection. The close-proximity radio connection could be, for example, a connection based on WLAN, Bluetooth, NFC (Near-Field Connection) or RFID (Radio Frequency Identification) technology.

According to an embodiment, the identification data of the apparatus may be utilized already, when trying to recognize the physical object. Thus, the step of obtaining the identification data of the apparatus (208) may be carried out before any of the above steps 200-206. If such identification data is available, the recognition of the apparatus may be fostered.

Once the identification data of the apparatus has been obtained, the device may start establishing a connection to the apparatus (210). The connection may be, for example, any of the connections mentioned above, i.e. a data connection via Internet, a close-proximity radio connection or a connection via a mobile communication network.

As a part of establishing the connection, authentication and is authorization (212) may be performed between the device and the apparatus to ensure that the user of the device has access rights to control the apparatus. If the apparatus is connected to Internet, the access rights may be controlled by a dedicated server in the network, whereby the user device may first request for the access rights and if granted, the authentication and authorization process may be carried out by the server. If the apparatus is not connected to Internet, the apparatus itself may comprise an application carrying out the authentication and authorization process.

The 3D model may then be provided with an interactive user interface (214) of the apparatus for controlling the operation of the apparatus remotely. According to an embodiment, at least a primary user interface of the apparatus is provided in the 3D model with interactive functionalities. According to an embodiment, the 3D model of the apparatus may comprise several interactive points, shown to the user of the device as highlighted, for example, and the user may access the interactive points by the control means of the user interface of the device, e.g. by touching the interactive points on the touch screen.

As a response to the commands given by the user through the control means of the user interface of the device, the corresponding commands are sent to the apparatus via the connection established between the device and the apparatus. The apparatus then executes the commands and thereby operates according to the commands given at the user interface of the 3D model.

Figure 3A:
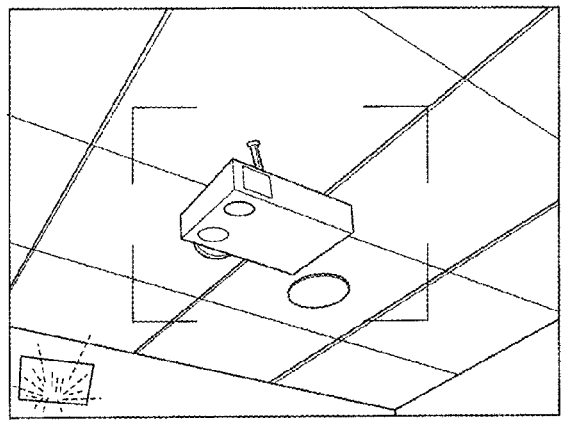
FIGS. 3a-3c show an exemplified implementation of the remote control method on a mobile device according to an embodiment.
Figure 3B:
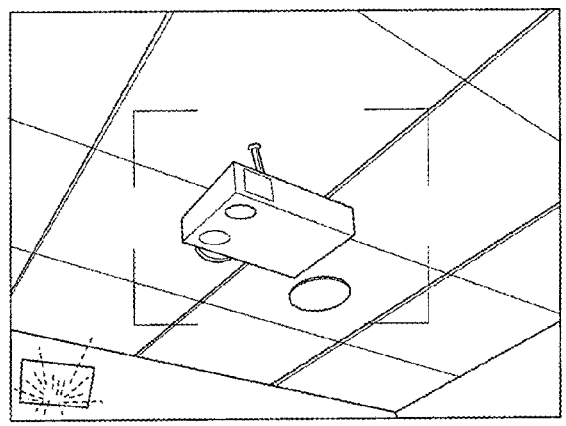
Figure 3C:
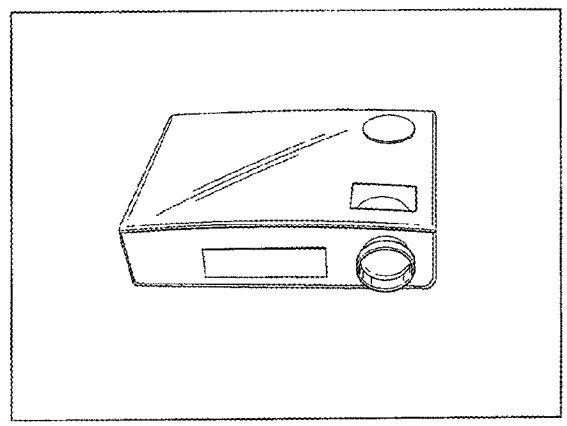

An example of the augmented reality remote control according to some of the embodiments is illustrated in FIGS. 3, 4 and 5. The example relates to controlling a data projector with a mobile device. The user of the mobile device may, for example, enter a conference room and notice the data projector, which the user wishes to use for projecting content from the mobile device. FIG. 3a shows a view from the display of the mobile device, showing how the user of the mobile device has pointed the camera of the mobile device towards the data projector. On the basis of at least image captured by the camera, the computer vision application of the mobile device recognizes the data projector. A successful recognition of the apparatus may be indicated e.g. as highlighted outline of the apparatus, as shown in FIG. 3b. The mobile device then retrieves a 3D model of the data projector from a memory, for example from the 3D model database located in a network server. The 3D model is shown on the display of the mobile device, as illustrated in FIG. 3c.

FIGS. 4a-4e show how the user of the mobile device may rotate the 3D model on the display, for example by sliding a finger to a certain direction on a touch screen.

After establishing a connection to the data projector and authentication/authorization process, the 3D model is shown on the display of the mobile device with an interactive user interface. The interactive areas of the 3D model are shown highlighted, as depicted in FIGS. 5a and 5b.

Figure 5A:
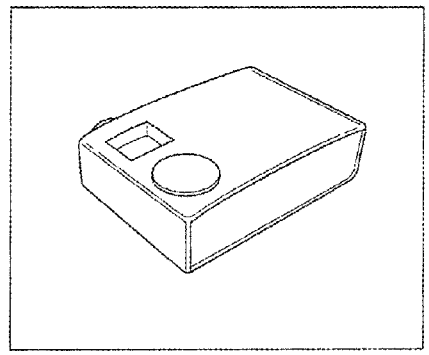
FIGS. 5a-5d show an exemplified implementation of interactive user interfaces in the remote control method according to an embodiment.
Figure 5B:
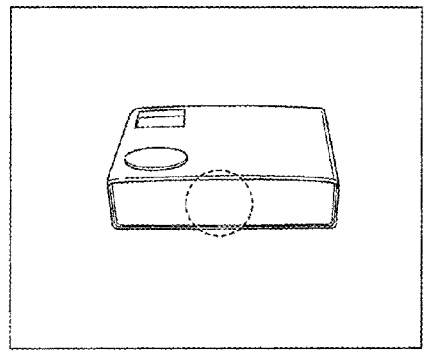
Figure 5C:
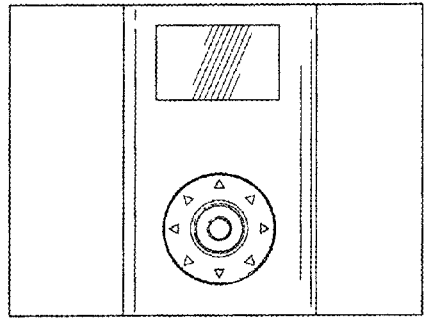

The highlighted area in FIG. 5a refers to the control panel of the data projector, and when the user of the mobile device touches the highlighted area, a more detailed interactive user interface of the control panel is shown on the display of the mobile device, as depicted in FIG. 5c. The user may control the operation of the data projector via this user interface.

Figure 5D:
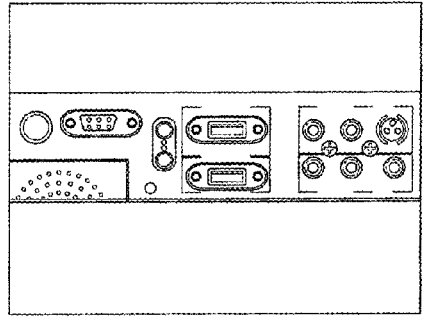

The highlighted area in FIG. 5b refers to the rear connector panel of the data projector, and touching this highlighted area opens a more detailed interactive user interface of the connector panel, as depicted in FIG. 5d. From the detailed connector panel, the user may select the inputs and outputs he/she wishes to access from his/her mobile device. Hence, by using the established connection and the interactive user interfaces of the 3D model, the user may remotely connect the mobile device to the data projector to project content from his/her mobile device.

Another example of the augmented reality remote control according to some of the embodiments is illustrated in FIG. 6. The example relates to identifying and controlling a vehicle with a mobile device. Again, the user of the mobile device points the camera of the mobile device towards the vehicle in order to capture at least one image of the vehicle. After being recognized by the computer vision application of the mobile device, the mobile device retrieves a 3D model of the recognized vehicle from a memory, and the 3D model may then be rotated to be shown from different views, as shown in FIGS. 6a-6c. The 3D model may be provided with additional information about the vehicle, such as model specifications, as shown in FIG. 6d. The OCR application of the computer vision may also be utilized to read the license plate of the vehicle, whereby the additional information may include the registered owner of the vehicle.

If the vehicle is provided with a wireless connection, such as a close-proximity radio, and the user of the mobile device has access rights to control the vehicle, an interactive user interface may be shown on the display of the mobile device, and the user may, for example, switch on stand-by lights or a heating apparatus or open the trunk lid.

A further example of the augmented reality remote control according to some of the embodiments relates to controlling operations of a building. The user of the mobile device may point the camera of the mobile device towards a building, for example user's home, and in response to being recognized by the computer vision application of the mobile device, the mobile device retrieves a 3D model of the interior of the building from a memory. From the 3D model shown on the display of mobile device, the user may then select an appropriate interactive user interface for controlling the operations of the building, such as switching on/off a burglar alarm, a heating system or indoor/outdoor lights.

According to another embodiment, as a continuation of the steps 200-206 in FIG. 2, the user of the device may be provided with an opportunity to compress a distance between a foreground object and a background object in a 3D space and illustrate the compressed space such that a 3D model of recognized background object is shown zoomed together with the foreground object. The embodiment enables, for example, to create a street view-type interface, where the visual information between a first point defined by a user and a second point defined by the user is compressed so that 3D models of buildings appearing at the second point are superimposed on top of the actual buildings in the display view.

Figure 7:
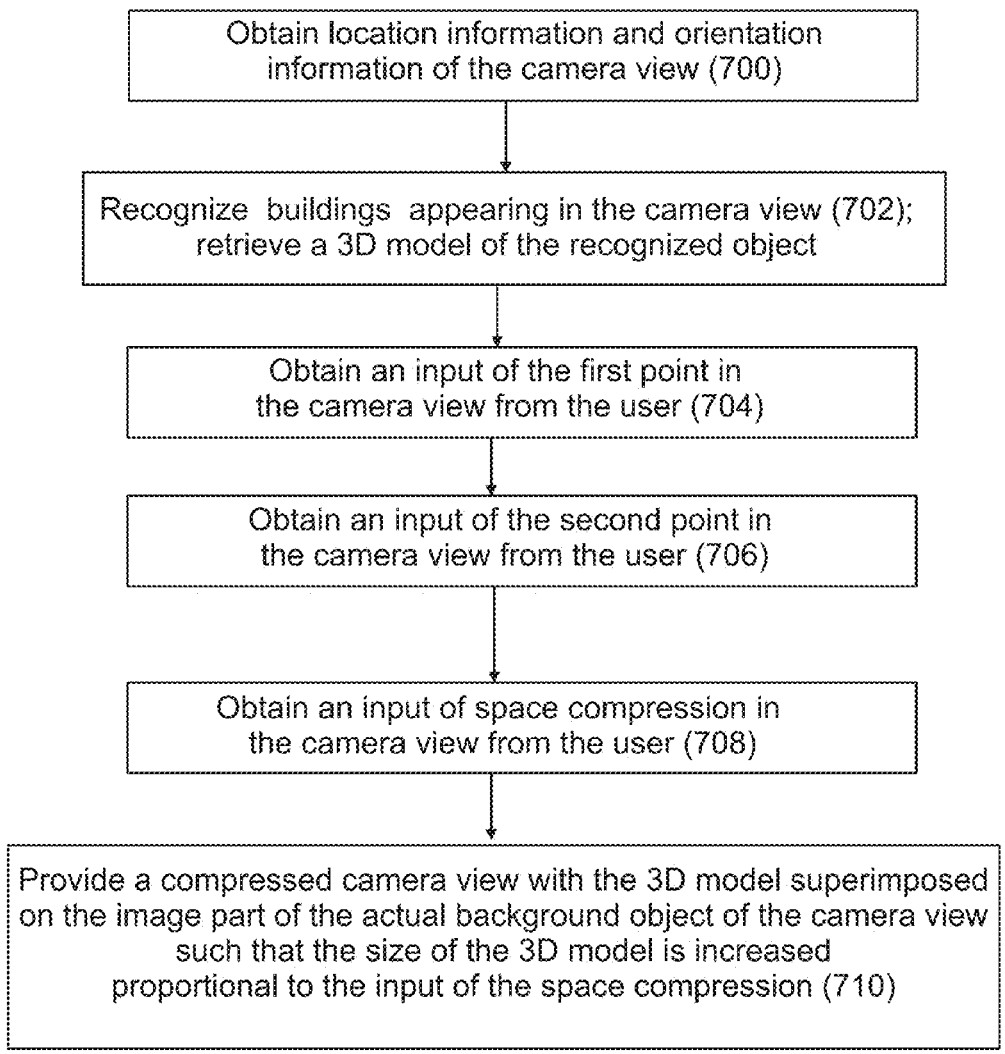
FIG. 7 shows a flow chart of a compression method of visual information according to an embodiment.

The embodiment may be implemented, for example, according to the flow chart of FIG. 7. The steps described in FIG. 7 may be continuation to the steps 200-206 in FIG. 2, or at least some of the steps in FIG. 7 may be performed during or between the steps 200-206 in FIG. 2.

First, location information of the mobile device and orientation information of the camera view of the mobile device are obtained (700). The location information may be obtained, for example, by determining the GPS data of the mobile device. The orientation information of the camera view may be obtained, for example, by determining sensor data from a compass and/or a gyroscope.

The camera view of the mobile device may show, for example, a street view with buildings and other architectural objects. One or more of the buildings and other architectural objects appearing in the camera view may be recognized (702), upon which the mobile device retrieves a 3D model of the recognized objects from a memory. According to an embodiment, the various sensor data obtained by the mobile device may be utilized, when trying to recognize the buildings and other architectural objects. For example, location information may be utilized to foster the recognition of the buildings and the architectural objects.

Next, the user of the mobile device determines a first point, for example a foreground object, in the camera view. Thus, an input of the first point in the camera view is obtained from the user (704), for example by detecting a finger press of the user on a first part of a touch screen showing the camera view.

Then the user of the mobile device determines a second point, for example a background object, in the camera view. Thus, an input of the second point in the camera view is obtained from the user (706), for example by detecting a finger press of the user on a second part of the touch screen showing the camera view, while keeping the first point touched.

In order to obtain a closer look of the background object, the user of the mobile device compresses the space between the first and the second points. Accordingly, an input of the space compression is obtained from the user (708), for example by detecting a pinching gesture with the fingers pressing the first and second part of the touch screen. According to an embodiment, the length of the pinching gesture defines the amount of compressing the space between first and second point.

As a result, the user is provided with a compressed camera view (710), where a 3D model of the building or an architectural object is superimposed on the image part of the actual background object of the camera view such that the size of the 3D model is increased proportional to the length of the pinching gesture.

In the embodiment described above, the middle part of the compressed camera view, i.e. the part between the first and the second point, is typically uninteresting for the user. Thus, according to an embodiment, the middle part of the compressed camera view is substantially blurred in order to focus the attention to the selected first and second points.

In a similar manner as described in the step 206 or in connection with FIG. 6 above, the user may be provided with additional information about buildings and objects at the first and second points. The additional information may be obtained from the same memory or database as the 3D models, for example.

According to an embodiment, instead of or in addition to using the camera view captured by the mobile device, the mobile device may be provided with a panorama view representing the area where the mobile device is currently located. The panorama view may be obtained from the same memory or database as the 3D models, for example. The panorama view to be used may be selected, for example, on the basis of the location information and the orientation information of the mobile device.

According to an embodiment, the additional information may comprise a miniature map placed in the camera view showing an indication of the compressed space. The miniature map may show the locations of the first and the second point as expanded in size and the middle part there between as compressed in size.

A skilled person appreciates that the order of the above steps may vary in various ways. For example, the order of determining the foreground object and the background object is irrelevant for the operation of the embodiment. Thus, the background object may be determined as the first point and the foreground object as the second point. Moreover, the 3D models may be obtained only after the first and the second points have been selected.

Figure 8A:
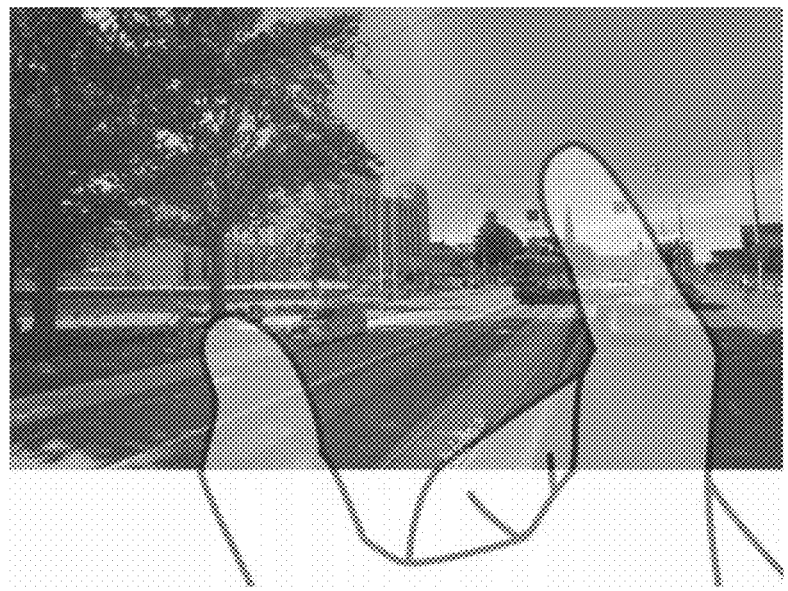
FIGS. 8a and 8b show an exemplified implementation of the compression method of visual information according to an embodiment.
Figure 8B:
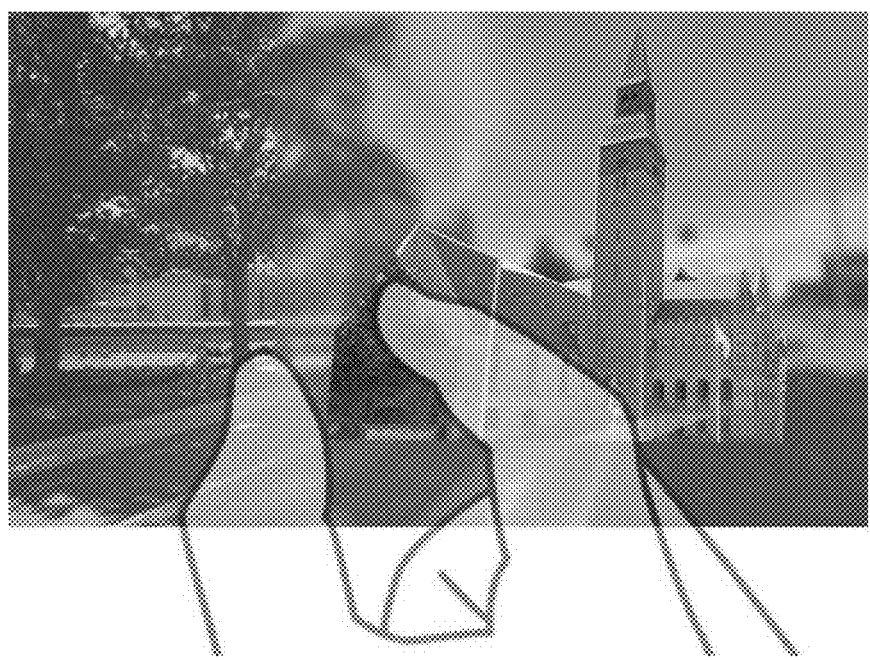

An example of the embodiment is shown in FIGS. 8a and 8b, where a camera view is obtained on a street in Helsinki. In FIG. 8a, the user selects the first and the second point in the camera view by pressing the points with fingers. The first point is a foreground building on the left side of the camera view. The second point is the National museum shown in the background of the camera view. In response to selecting the first and second points, the corresponding 3D map coordinates for these buildings are determined.

In FIG. 8b, the user pinches the fingers (indicated by the arrow) to compress the space between the first and second point. The obtained 3D model of the National museum is superimposed in a larger size on top of the image of the actual building, wherein the distance of pinching the fingers defines the size of the National museum 3D model. In other words, the distance of pinching the fingers also defines the amount of compressing the middle space. The middle space of the camera view is preferably blurred, as shown in FIG. 8b, since it is substantially irrelevant for the user.

According to an embodiment, instead of or in addition to using 3D models superimposed in a larger size on top of the image of the actual building, partial photos of the location of the second point may be used for representing the second point. The partial photos may be used as picture-in-picture and by zooming them in a larger size on top of the image of the actual building, the impression of compressing then middle space between the first and the second point can be created.

Figure 9A:
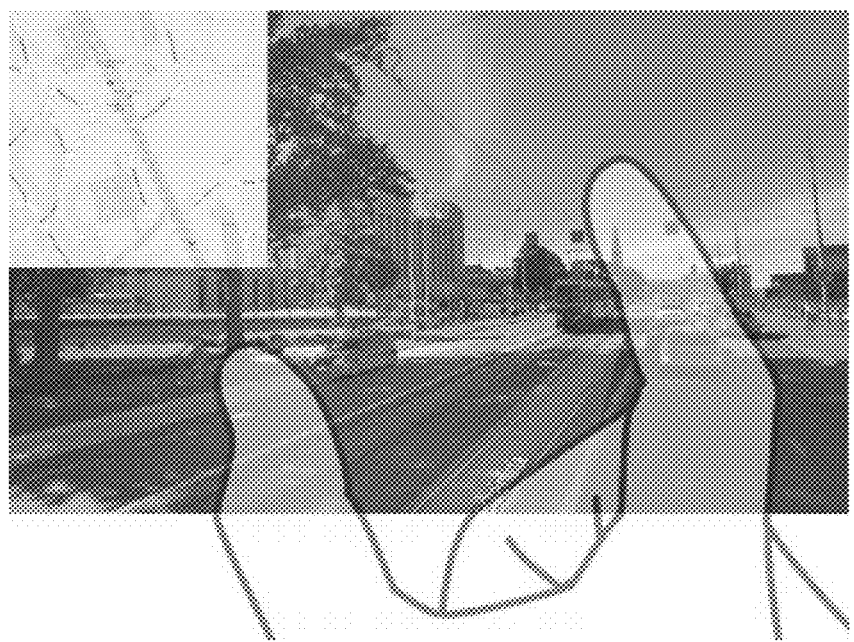
FIGS. 9a and 9b show another exemplified implementation of the compression method of visual information according to an embodiment.
Figure 9B:
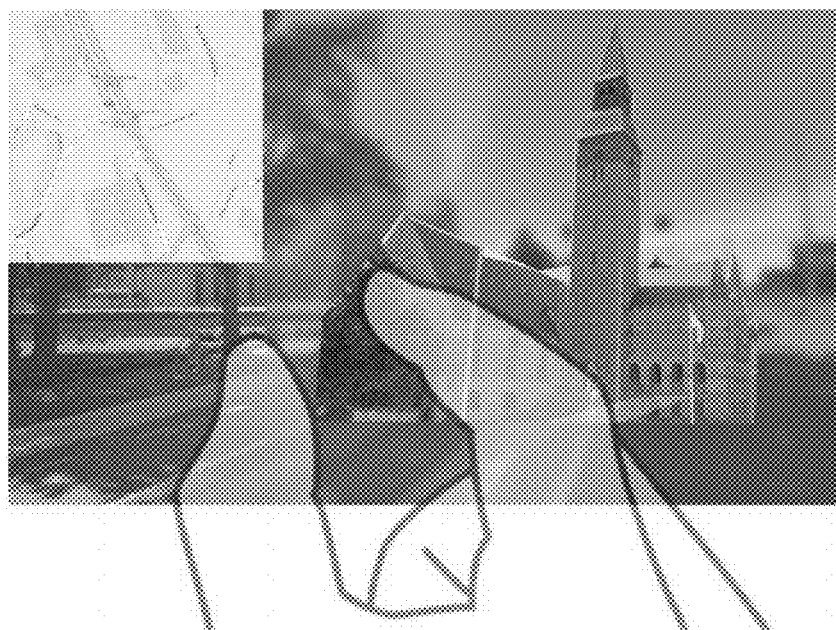

FIGS. 9a and 9b show an example, where the additional information in the form of a miniature map placed in the camera view is applied to the example of FIGS. 8a and 8b. FIG. 9a shows the miniature map after the user has selected the first and the second points. In response to compressing the space between the first and the second points by the pinching gesture, the compression of space may be shown in the miniature map as distorted dimensions, where the sizes of the areas around the first and second point are expanded in size whereas the middle space is compressed. Thus, the interesting areas around the first and second point can be shown more detail. FIG. 9b shows an example of the miniature map with distorted dimensions.

Figure 10:
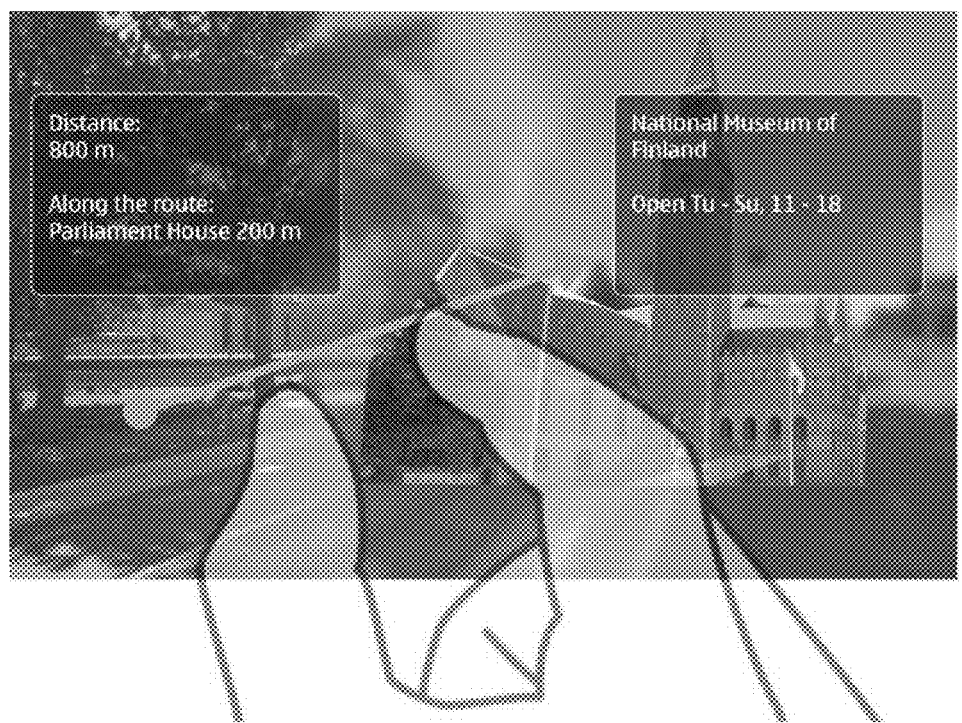
FIG. 10 shows another exemplified implementation of the compression method of visual information according to an embodiment.

FIG. 10 shows another example, where the additional information is shown in the camera view. Additional information may comprise textual information about one or more buildings at the second point, as well as the actual distance between the first and the second points. The amount of information about the second point may depend on the amount of compressing the middle space. Herein, a principle of semantic zoom may be applied such that the more the middle space is compressed, the more detailed additional information is shown about the buildings in the second point. Moreover, the additional information may include information about the building at the first point, and the relationship between the buildings at the first and second points. For example, information about point-of-interests in the middle space, i.e. along the route between the first and the second points, may be shown as a summary in the camera view, as shown in FIG. 10.

As described above, the 3D model shown on the display of the mobile device may be rotated freely on the display. According to an embodiment, the 3D model may relate to a building or another architectural object. The user may select a 3D model of a building to be superimposed on the camera view and rotate it through interactions on the touch screen. The camera view image underneath the 3D model may be blurred or softened to indicate that the user can focus on manipulating the building's 3D model. The relationship between the user's real-world vantage point and the virtual vantage point he has to the building after rotating its 3D model may be indicated on the display, e.g. by an arrow. Accordingly, by rotating the 3D model of the building, the user can see for example what entrances and shops there are in the other sides of the building than in the current vantage point.

A skilled person appreciates that any of the embodiments described above may be implemented as a combination with one or more of the other embodiments, unless there is explicitly or implicitly stated that certain embodiments are only alternatives to each other.

The various embodiments may provide advantages over the state of the art. For example, only by capturing an image of a physical object may provide further information about the object, and optionally an user interface for controlling operations of the object. Furthermore, recognizing the physical objects by computer vision and automatically retrieving a 3D model corresponding to the physical object may provide the user quickly with information about the physical object and a user interface for controlling it. Moreover, the 3D model shown on the display of mobile device provides an intuitive manner for observing the physical object and for controlling its operations. Controlling various apparatuses remotely in visited place does not necessarily require connecting to a local area network.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, or CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

What is claimed is:

1. A method comprising:
receiving an image captured, by a device equipped with a camera, of a first physical object and a second physical object;
providing for recognition of the first physical object and the second physical object based, at least in part, on the at least one captured image;
providing for retrieval of a 3-dimensional (3D) model of the first physical object and retrieval of a 3D model of the second physical object from a memory;
providing for display of the 3D model of the first physical object and the 3D model of the second physical object on a display of the device, wherein the display comprises a view of a space interconnecting the first physical object and the second physical object wherein the 3D model of the first physical object is superimposed over the image of the first physical object, and the 3D model of the second physical object is superimposed over the image of the second physical object; and
providing for compression of visual information between the first physical object and the second physical object in a displayed image.

2. A method of claim 1, further comprising:
providing for recognition of the first physical object using a computer vision method.

3. A method of claim 1, further comprising:
providing for rotation of the 3D model of the first physical object presented on the display.

4. A method of claim 3, wherein the rotating of the 3D model of the first physical object presented on the display is performed on a touch sensitive display screen.

5. A method of claim 1, further comprising:
providing the 3D model of the first physical object with additional information about the physical object to be shown on the display.

6. A method of claim 1, wherein the first physical object and the second physical object are each a building or an architectural object.

7. A method of claim 6, further comprising:
establishing location information of the device and orientation information of the camera view of the device;
providing for recognition of the first physical object and the second physical object appearing in the camera view based at least in part on the location and orientation information;
receiving an input of a first point in the camera view from the user, wherein the first point indicates at least one of a foreground or a background of the camera view;
receiving an input of a second point in the camera view from the user, wherein the second point indicates another of the foreground or the background of the camera view;
receiving an input associated with space compression in the camera view from the user; and
providing for a compressed camera view with a 3D model of the first physical object superimposed on an image part of the background of the camera view such that the size of the 3D model of the first physical object is increased proportional to the input of space compression.

8. A method of claim 7, wherein said input of the first point is obtained by detecting a finger press of the user on a first part of a touch screen showing the camera view; and wherein said input of the second point is obtained by detecting a finger press of the user on a second part of the touch screen showing the camera view, while keeping the first point touched.

9. A method of claim 8, wherein said input of the space compression is obtained by detecting a pinching gesture with the fingers pressing the first and second part of the touch screen.

10. A method according to claim 9, wherein a length of the pinching gesture defines the amount of compressing of the space between first and second points.

11. An apparatus comprising:
at least one processor; and
at least one memory including computer program code for one or more programs,
the at least one memory and the computer program code configured to, with the at least one processor, cause the apparatus to perform at least the following,
receive an image captured by a camera of a first physical object and a second physical object;
recognize the first physical object and the second physical object based, at least in part, on the at least one captured image;
retrieve a 3-dimensional (3D) model of the first physical object and a 3D model of the second physical object from a memory; and
cause display of the 3D model of the first physical object and the 3D model of the second physical object on a display of the apparatus, wherein the display comprises a view of a space interconnecting the first physical object and the second physical object wherein the 3D model of the first physical object is superimposed over the image of the first physical object, and the 3D model of the second physical object is superimposed over the image of the second physical object; and provide for compression of visual information between the first physical object and the second physical object in a displayed image.

12. An apparatus of claim 11, wherein the apparatus is further caused to:
recognize the first physical object by a computer vision method.

13. An apparatus of claim 11, wherein the apparatus is further caused to:
rotate the 3D model of the first physical object on the display.

14. An apparatus of claim 13, wherein the rotating of the 3D model of the first physical object on the display is performed on a touch sensitive display screen.

15. An apparatus of claim 11, wherein the apparatus is further caused to:
provide the 3D model of the first physical object with additional information about the first physical object to be shown on the display.

16. An apparatus of claim 11, wherein the first physical object is a building or an architectural object.

17. An apparatus of claim 16, wherein the apparatus is further caused to:
obtain location information of the device and orientation information of the camera view of the device;
recognize the first physical object and the second physical object appearing in the camera view based at least in part on the location and orientation information;
obtain an input of a first point in the camera view from the user, wherein the first point indicates at least one of a foreground or a background of the camera view;
obtain an input of a second point in the camera view from the user, wherein the second point indicates another of the foreground or the background of the camera view; and
provide a compressed camera view with a 3D model of the first physical object superimposed on an image part of the background of the camera view such that the size of the 3D model of the first physical object is increased proportional to the input of space compression.

18. An apparatus of claim 17, wherein said input of the first point is obtained by detecting a finger press of the user on a first part of a touch screen showing the camera view; and wherein said input of the second point is obtained by detecting a finger press of the user on a second part of the touch screen showing the camera view, while keeping the first point touched.

19. An apparatus according to claim 18, wherein said input of the space compression is obtained by detecting a pinching gesture with the fingers pressing the first and second part of the touch screen.

20. An apparatus according to claim 19, wherein a length of the pinching gesture defines the amount of compressing of the space between first and second point.

21. A computer program product comprising at least one non-transitory computer-readable storage medium having computer-readable program instructions for one or more programs stored therein, the computer-readable program instructions comprising program instructions configured to cause an apparatus to perform a method comprising:
receive an image captured by a camera of a first physical object and a second physical object;
recognizing the first physical object and the second physical object based, at least in part, on the at least one captured image;
retrieving a 3-dimensional (3D) model of the first physical object and a 3D model of the second physical object from a memory; and
displaying the 3D model of the first physical object and the 3D model of the second physical object on a display of the apparatus, wherein the display comprises a view of a space interconnecting the first physical object and the second physical object wherein the 3D model of the first physical object is superimposed over the image of the first physical object, and the 3D model of the second physical object is superimposed over the image of the second physical object; and
providing for compression of visual information between the first physical object and the second physical object in a displayed image.

22. A method of claim 7, wherein the input of the first point in the camera view corresponds to the first physical object in the camera view.

23. A method of claim 22, wherein the input of the second point in the camera view corresponds to the second physical object in the camera view.

24. An apparatus of claim 17, wherein the input of the first point in the camera view corresponds to the first physical object in the camera view.

25. An apparatus of claim 24, wherein the input of the second point in the camera view corresponds to the second physical object in the camera view.

* * * * *